US009714170B2

(12) United States Patent
Iida et al.

(10) Patent No.: US 9,714,170 B2
(45) Date of Patent: Jul. 25, 2017

(54) FILLER AND GLASS COMPOSITION, AND PROCESS FOR PRODUCING HEXAGONAL PHOSPHATE-BASED COMPOUND

(71) Applicant: TOAGOSEI CO., LTD., Tokyo (JP)

(72) Inventors: Miki Iida, Nagoya (JP); Yasuharu Ono, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 15/037,220

(22) PCT Filed: Nov. 13, 2014

(86) PCT No.: PCT/JP2014/080057

§ 371 (c)(1),
(2) Date: May 17, 2016

(87) PCT Pub. No.: WO2015/076175

PCT Pub. Date: May 28, 2015

(65) Prior Publication Data

US 2016/0289076 A1 Oct. 6, 2016

(30) Foreign Application Priority Data

Nov. 20, 2013 (JP) ................................ 2013-239675

(51) Int. Cl.

| | |
|---|---|
| ***C04B 35/447*** | (2006.01) |
| ***C01B 25/45*** | (2006.01) |
| ***C03C 8/20*** | (2006.01) |
| ***C03C 8/24*** | (2006.01) |
| ***C01B 25/37*** | (2006.01) |
| ***C03C 14/00*** | (2006.01) |
| ***C03C 1/00*** | (2006.01) |
| ***C03C 3/14*** | (2006.01) |
| ***C03C 3/145*** | (2006.01) |
| ***C03C 3/16*** | (2006.01) |
| ***C03C 3/17*** | (2006.01) |
| ***C03C 3/21*** | (2006.01) |

(52) U.S. Cl.

CPC ............ *C01B 25/45* (2013.01); *C01B 25/372* (2013.01); *C03C 1/00* (2013.01); *C03C 3/142* (2013.01); *C03C 3/145* (2013.01); *C03C 3/16* (2013.01); *C03C 3/17* (2013.01); *C03C 3/21* (2013.01); *C03C 8/20* (2013.01); *C03C 8/24* (2013.01); *C03C 14/006* (2013.01); *C03C 2205/00* (2013.01); *C03C 2214/16* (2013.01); *C03C 2214/20* (2013.01)

(58) Field of Classification Search

CPC .... C04B 35/447; C04B 35/486; C01B 25/372
See application file for complete search history.

(56) References Cited

U.S. PATENT DOCUMENTS

| | | | | |
|---|---|---|---|---|
| 4,112,194 A * | 9/1978 | Chenot | .................. | C09K 11/70 252/301.4 F |
| 8,333,833 B2 * | 12/2012 | Sugiura | ................. | C01B 25/372 106/286.2 |
| 8,603,929 B2 * | 12/2013 | Sugiura | ................. | C01B 25/372 501/102 |
| 2010/0267544 A1 * | 10/2010 | Sugiura | ................. | C01B 25/372 501/102 |
| 2012/0058877 A1 | 3/2012 | Sugiura | | |

FOREIGN PATENT DOCUMENTS

| | | |
|---|---|---|
| CN | 102421717 A | 4/2012 |
| JP | 2-267137 A | 10/1990 |
| JP | 5-17112 A | 1/1993 |
| JP | 2000-290007 A | 10/2000 |
| JP | 2005-35840 A | 2/2005 |
| JP | 2005-162570 A | 6/2005 |
| JP | 2006-111463 A | 4/2006 |
| JP | 2006-306677 A | 11/2006 |
| JP | 2011-136871 A | 7/2011 |
| JP | 2011-168491 A | 9/2011 |
| WO | WO 2010/131731 A1 | 11/2010 |

OTHER PUBLICATIONS

International Search Report for PCT/JP2014/080057 mailed on Feb. 10, 2015.

Written Opinion of the International Searching Authority for PCT/JP2014/080057 (PCT/ISA/237) mailed Feb. 10, 2015.

The State Intellectual Property Office of People's Republic of China, "First Notice of Opinion of Examination," issued in connection with Chinese Patent Application No. 201480062757.1, dated Mar. 22, 2017.

* cited by examiner

*Primary Examiner* — Noah Wiese
(74) *Attorney, Agent, or Firm* — Birch, Stewart, Kolasch & Birch, LLP

(57) ABSTRACT

A filler that can suppress thermal expansion of a glass composition with a small amount thereof added and is also excellent in terms of flowability when the glass composition is melted, and a glass composition containing the filler are provided. There is also provided a process for producing a hexagonal phosphate-based compound that can be suitably used as the filler using a simple, industrially advantageous method.

The filler of the present invention contains a hexagonal phosphate-based compound that has a purity of 90% or higher and is represented by the following Formula 1, the filler having a content of an ionic compound that is no greater than 1.0 wt %, $$K_aZr_b(PO_4)_3 \quad (1)$$

wherein, in Formula 1, a is a positive number of from 0.8 to 1.2 and b is a positive number satisfying a+4b=9.

4 Claims, No Drawings

FILLER AND GLASS COMPOSITION, AND PROCESS FOR PRODUCING HEXAGONAL PHOSPHATE-BASED COMPOUND

TECHNICAL FIELD

The present invention relates to a filler and a glass composition, and a process for producing a hexagonal phosphate-based compound.

BACKGROUND ART

With regard to phosphate-based compounds, there are those that are amorphous and those that are crystalline with a two-dimensional layered structure or a three-dimensional network structure. Among them, crystalline phosphate-based compounds having a three-dimensional network structure are excellent in terms of heat resistance, chemical resistance, radiation resistance, low thermal expansion, etc., and their application to radioactive waste immobilization, solid electrolytes, gas adsorption/separation agents, catalysts, antimicrobial agent starting materials, low thermal expansion fillers, etc. has been considered.

Low thermal expansion fillers comprising various phosphate-based compounds have already been reported, and have been applied to sealing materials, etc. For example, Patent Document 1 discloses a sealing material comprising a mixture of a low-melting-point glass powder and a low thermal expansion material powder such as $NaZr_2(PO_4)_3$, $CaZr_2(PO_4)_3$, or $KZr_2(PO_4)_3$, Patent Document 2 discloses $NbZr_2(PO_4)_3$ powder as a filler powder for lead-free glass, and Patent Document 3 discloses $Zr_2(WO_4)(PO_4)_2$ powder.

Furthermore, as methods for synthesizing these zirconium phosphates, a calcination method in which starting materials are dry mixed and then calcined at a temperature of 1,000° C. or higher using a calcining furnace, etc. (e.g. Patent Document 2), a hydrothermal method in which starting materials are mixed in water or in a water-containing state, then pressurized, and heated, a wet method in which starting materials are mixed in water and then heated under normal pressure, etc. are known.

PRIOR ART DOCUMENTS

Patent Documents

Patent Document 1: JP-A-02-267137 (JP-A denotes a Japanese unexamined patent application publication)
Patent Document 2: JP-A-2000-290007
Patent Document 3: JP-A-2005-035840

SUMMARY OF THE INVENTION

Problems to be Solved by the Invention

However, the effect of conventional low thermal expansion fillers as disclosed in Patent Documents 1 to 3 is not sufficient. Specifically, lead-free low-melting-point glass, which has widely been employed in recent years, generally has larger thermal expansion than lead glass, and there is therefore the problem that the coefficient of thermal expansion of a glass composition cannot be lowered sufficiently even by combining it with a large amount of a conventional low thermal expansion filler. Furthermore, when a large amount of low thermal expansion filler is added to a glass composition, there is the problem that the flowability when the glass composition is melted is lowered.

Moreover, when a zirconium phosphate is produced by a calcination method, aggregated zirconium phosphate having high hardness is formed by sintering, and when this is ground there is the problem that a grinding device is easily worn and contamination due to wear products easily occurs, and the shape and particle size of ground crystals cannot be controlled.

The present invention has been accomplished in light of these problems, and it is an object thereof to provide a filler that can suppress thermal expansion of a glass composition with a small amount thereof added and is also excellent in terms of flowability when the glass composition is melted, and to provide a glass composition comprising the filler.

It is another object of the present invention to provide a process for producing a hexagonal phosphate-based compound that can be suitably used as the filler using a simple, industrially advantageous method.

Means for Solving the Problems

As a result of an investigation into flowability when a glass composition comprising a filler is melted, the present inventors have found that the flowability at the time of melting is excellent when the amount of an ionic compound in the filler is no greater than a predetermined amount. Furthermore, it has been found that when a specific hexagonal phosphate-based compound is produced using a layered zirconium phosphate, a potassium-containing compound, and a zirconium-containing compound, a hexagonal phosphate-based compound having a small particle size can easily be produced, and the present invention has thus been accomplished.

That is, the present invention is as follows.

<1> A filler, comprising a hexagonal phosphate-based compound that has a purity of 90% or higher and is represented by the following Formula 1, the filler having a content of an ionic compound that is no greater than 1.0 wt %, $$K_aZr_b(PO_4)_3 \quad (1)$$

wherein, in Formula 1, a is a positive number of from 0.8 to 1.2 and b is a positive number satisfying a+4b=9, <2> the filler according to <1>, wherein the ionic compound includes a potassium ion, a zirconium ion, and a phosphate ion, <3> the filler according to <1> or <2>, wherein a median diameter of the filler on a volume basis measured using a laser diffraction type particle size distribution analyzer is from of 0.05 μm to 10 μm, <4> the filler according to any one of <1> to <3>, wherein a maximum particle size of the filler on a volume basis measured using a laser diffraction type particle size distribution analyzer is no greater than 50 μm, <5> a glass composition, comprising the filler according to any one of <1> to <4>, <6> a process for producing a hexagonal phosphate-based compound represented by the following Formula 1, the process comprising:

obtaining a mixture by combining a layered zirconium phosphate, a potassium-containing compound, and a zirconium-containing compound other than the layered zirconium phosphate;

calcining the mixture; and grinding subsequent to the calcining:

$$K_aZr_b(PO_4)_3 \quad (1)$$

wherein, in Formula 1, a is a positive number of from 0.8 to 1.2 and b is a positive number satisfying a+4b=9, <7> the process for producing a hexagonal phosphate-based compound according to <6>, wherein the layered zirconium phosphate comprises particles having a median diameter on a volume basis measured by a laser diffraction type particle size distribution analyzer of from 0.05 μm to 10 μm, <8> the process for producing a hexagonal phosphate-based compound according to <6> or <7>, wherein the potassium-containing compound is combined in an amount per mole of the layered zirconium phosphate of from 0.8 to 1.2 times a theoretical amount of the hexagonal phosphate-based compound to be produced, and <9> the process for producing a hexagonal phosphate-based compound according to any one of <6> to <8>, wherein a calcining temperature is from 650° C. to 1,500° C.

MODES FOR CARRYING OUT THE INVENTION

The present invention is explained below. Unless otherwise specified, '%' means 'wt %', 'parts' means 'parts by weight', and 'ppm' means 'ppm by weight'.

Furthermore, a numerical range denoted by 'to' means a numerical range that includes the values before and after the 'to'.

The filler of the present invention has a very low content of ionic compounds that would adversely affect flowability of a glass composition, and has not conventionally been implemented as a low thermal expansion filler. Such a filler is obtained using as starting materials a layered zirconium phosphate, a potassium-containing compound, and a zirconium-containing compound through steps of mixing, calcining, and grinding. A glass composition comprising the filler of the present invention can cope with fine shapes and exhibits excellent low thermal expansion performance. Furthermore, the filler of the present invention is also called 'the low thermal expansion filler of the present invention' below.

{1} Filler

The filler of the present invention comprises a hexagonal phosphate-based compound that has a purity of 90% or higher and is represented by the following Formula 1, the filler having a content of an ionic compound content that is no greater than 1.0 wt %, $$K_aZr_b(PO_4)_3 \quad (1)$$

wherein, in Formula 1, a is a positive number of from 0.8 to 1.2 and b is a positive number satisfying a+4b=9. a is preferably from 0.9 to 1.1, and more preferably from 0.92 to 1.05. When a is a positive number of from 0.8 to 1.2, the filler exhibits excellent low thermal expansion.

Since a composition comprising the filler of the present invention has a low thermal expansion rate, it may be used mainly in a sealing material for an electronic component such as a Braun tube, a plasma display panel (PDP), a fluorescent display tube, an organic EL, or an IC ceramic package. It may also be used for suppressing thermal expansion of an IC sealing resin or a resin adhesive.

The filler of the present invention comprises a hexagonal phosphoric acid-based salt compound that has a high purity of 90 wt % or greater and is represented by Formula 1. It has high crystalline purity and high chemical purity, is little degraded by erosion of glass when heated and melted with glass due to uniform crystallization, and can efficiently control thermal expansion.

In the present invention, the purity of a hexagonal phosphate-based compound represented by Formula 1 is determined as the product of the crystalline purity and the chemical purity. It is necessary for the purity of the hexagonal phosphate-based compound represented by Formula 1 to be 90 wt % or greater. The purity is preferably at least 93 wt %. Needless to say the upper limit for the purity is 100 wt %.

The crystalline purity of a hexagonal phosphate-based compound as the filler may be ascertained by comparison of the intensities of main peaks with a reference X-ray diffraction chart from powder X-ray diffraction or by the presence or absence of peaks for impurities due to crystalline components other than the hexagonal phosphate-based compound. Furthermore, chemical purity may be ascertained by nondestructive compositional analysis such as fluorescence X-ray, by measurement of the absolute value of the content of metal and phosphorus components using inductively coupled plasma (ICP) optical emission spectroscopy after dissolving crystals by an oxidizing agent or a strong acid containing hydrofluoric acid, or by measurement of the water content of water of crystallization, attached water, etc. by a thermal analysis such as simultaneous thermogravimetric-differential thermal analysis (TG-DTA).

With regard to a preferable value for the purity, in the case of the crystalline purity, the intensity of a main peak (2θ=20.3°) of a desired hexagonal phosphate-based compound detected by powder X-ray diffraction is preferably at least 90% relative to the sum of the intensities of the main peak of the desired hexagonal phosphate-based compound and the main peaks (2θ=9.8°, 21.5°, and/or 28.3°) of impurities, and is more preferably at least 95% (peak intensity being proportional to wt %). Similarly, in the case of chemical purity, a desired hexagonal phosphate-based compound is preferably at least 90 wt % of the solids content weight, and more preferably at least 95 wt %.

It is necessary for the ionic compound content in the filler to be no greater than 1.0 wt %. The content is preferably no greater than 0.6 wt %, and more preferably no greater than 0.3 wt %. Due to the ionic compound content being no greater than 1.0 wt %, the flowability of a glass composition is not impaired. The ionic compound means an ionic compound that is leached when the filler is immersed in hot water, and is specifically a starting material-derived ionic compound such as a potassium ion, a zirconium ion, or a phosphate ion. These ionic compounds may be quantitatively determined by ICP emission analysis. Details of an analytical method are described later.

The ionic compound content in the filler may be adjusted by the mixing ratio of the layered zirconium phosphate with the potassium-containing compound and the zirconium-containing compound other than the layered zirconium phosphate, which are starting materials.

The mechanism via which the ionic compound content degrades the flowability of a glass composition is surmised to be as follows. When the glass composition is heated and melted, the ionic compound becomes detached from the filler and reacts with the glass component, thus changing the glass formulation. It is thought that, as a result, the softening point might increase or partial crystallization might occur, and the flowability of the glass composition is degraded.

The particle size of the filler in the present invention may be defined using a laser diffraction type particle size distribution analyzer, and a median diameter obtained by measuring in a state in which it is dispersed in deionized water and analyzing on a volumetric basis may be used as a representative value for the particle size. The median diameter is preferably from 0.05 μm to 10 μm, more preferably from 0.1 μm to 5 μm, and yet more preferably from 0.5 μm to 3 μm. When it is used as a low thermal expansion filler, if the median diameter is 0.05 μm or greater, the viscosity of the composition is suppressed so that it does not become too high, and handling is easy. On the other hand, when it is no greater than 10 μm, it can be desirably used in an application in which fine gaps of a semiconductor device, etc. are filled.

When the processability to various products is taken into consideration, it is not only the median diameter but also the maximum particle size that is important; the maximum particle size of the filler is preferably no greater than 50 μm, more preferably no greater than 20 μm, and yet more preferably no greater than 10 μm. The lower limit value is preferably at least 0.05 μm.

The configuration in which the filler of the present invention is used is not particularly limited, and it may be mixed with another component as appropriate according to the intended application or may be compounded with another material. It may be used in various configurations such as for example a powder, a powder-containing dispersion, powder-containing particles, a powder-containing paint, a powder-containing fiber, a powder-containing plastic, and a powder-containing film, and it may be used as appropriate in a material that requires controlling of thermal expansion. Furthermore, the filler of the present invention may be mixed with another filler as necessary in order to adjust the processability or thermal expansion. Specific examples include cordierite, zirconium phosphotungstate, zirconium tungstate, β spodumene, β eucryptite, lead titanate, aluminum titanate, mullite, zircon, silica, celsian, willemite, and alumina, which are low thermal expansion fillers.

{2} Process for Producing Hexagonal Phosphate-Based Compound

With regard to the filler of the present invention, the process for producing it is not particularly limited, but it is preferably a hexagonal phosphate-based compound produced by the process for producing a hexagonal phosphate-based compound of the present invention.

The process for producing a hexagonal phosphate-based compound of the present invention comprises obtaining a mixture by combining a layered zirconium phosphate, a potassium-containing compound, and a zirconium-containing compound other than the layered zirconium phosphate (hereinafter, called a 'preparation step'); calcining the mixture (hereinafter, called a 'calcining step'); and grinding subsequent to the calcining (hereinafter, called a 'grinding step').

Since the coefficient of thermal expansion of a cured material can be reduced by using a hexagonal phosphate-based compound obtained by the production process as a filler in a composition for a glass, a resin, etc., it can be applied to a sealing material for an electronic component such as a Braun tube, a plasma display panel (PDP), a fluorescent display tube, an organic EL, or an IC ceramic package. It can also be used in order to suppress thermal expansion of an IC-sealing resin or a resin adhesive.

The starting materials used for production of the hexagonal phosphate-based compound of the present invention are layered zirconium phosphate, a potassium-containing compound, and a zirconium-containing compound other than the layered zirconium phosphate.

Layered zirconium phosphate, which is the main starting material, is a layered crystal having a two-dimensional layered space and is known as an ion exchanger, and there are an α type crystal, a β type crystal comprising the anhydride thereof, a γ type crystal, etc. depending on the type of constituent phosphoric acid group and water of crystallization. Research has been carried out into selectivity for the types of cation that are easily ion-exchanged due to difference in the distance between layers among the crystal types, but until now it has not been known that one having low thermal expansion is obtained when a hexagonal phosphate-based compound is produced using these layered zirconium phosphates as a starting material.

As the layered zirconium phosphate used as a starting material, the α type crystal and the γ type crystal are preferable, and the α type crystal is more preferable, since a fine filler is easily obtained. Specifically, the compounds below can be cited.

α Layered zirconium phosphate: $Zr(HPO_4)_2.H_2O$

γ Layered zirconium phosphate: $Zr(H_2PO_4)(PO_4).2H_2O$

It is preferable to select the particle size of the layered zirconium phosphate used according to the desired particle size of the hexagonal phosphate-based compound obtained since the particle size of the layered zirconium phosphate affects the particle size of the compound. The particle size of the layered zirconium phosphate used as the starting material may be measured using a laser diffraction type particle size distribution analyzer; measurement is carried out in a state in which it is dispersed in deionized water, and a median diameter determined on a volumetric basis may be used as a representative value for the particle size. When a hexagonal phosphate-based compound obtained by the production process of the present invention is used as a filler component of a glass, resin, etc. composition, in order to use the composition for applications involving filling or molding of a fine shape or gap, the smaller the median diameter the better, but when it is too small the specific surface area increases and the flowability is sometimes degraded. A preferred median diameter as a filler is as described above, and the median diameter of the layered zirconium phosphate used as a starting material is preferably from 0.05 μm to 10 μm, more preferably from 0.1 μm to 5 μm, and yet more preferably from 0.5 μm to 3 μm. When the median diameter of the layered zirconium phosphate is in the range of from 0.05 μm to 10 μm, grinding can be easily carried out in the grinding step, which is described later.

As the other starting materials used in production of the hexagonal phosphate-based compound, there are the potassium-containing compound and the zirconium-containing compound other than the layered zirconium phosphate. These compounds are starting materials that adjust the amount of potassium and the amount of zirconium of the hexagonal phosphate-based compound.

Examples of the potassium-containing compound include KOH, $K_2(CO_3)$, $KH(CO_3)$, KCl, $KNO_3$, and $K_2SO_4$. Among them, KOH, $K_2(CO_3)$, and $KH(CO_3)$ are preferable from the viewpoint of ease of reaction. With regard to these potassium-containing compounds, one type may be used on its own or two or more types may be used in combination.

Examples of the zirconium-containing compound other than the layered zirconium phosphate include $Zr(OH)_2$, $ZrO_2$, $Zr_2(CO_3)(OH)_2O_2$, $ZrOCl_2.8H_2O$, and $Zr(SO_4)_2.4H_2O$. Among them, $Zr(OH)_2$ and $Zr_2(CO_3)(OH)_2O_2$ are preferable from the viewpoint of ease of reaction. With regard to these zirconium-containing compounds, one type may be used on its own or two or more types may be used in combination.

The mixing ratio of the starting materials when synthesizing a hexagonal phosphate-based compound by the production process of the present invention is basically the theoretical formulation of the hexagonal phosphate-based compound that is to be synthesized (the mixing ratio coinciding with the compositional formula), but they do not necessarily coincide with each other completely. For example, with regard to the potassium-containing compound, adding a slight excess thereof relative to the stoichiometric amount of the hexagonal phosphate-based compound to be synthesized promotes crystallization at low temperature at the time of calcining, and with regard to the zirconium-containing compound other than the layered zirconium phosphate, adding a slight excess thereof relative to the stoichiometric amount of the hexagonal phosphate to be synthesized makes it harder for a pyrophosphate salt, which is easily formed as a by-product, to be precipitated, which is preferable.

A preferred amount of the potassium-containing compound added per mole of layered zirconium phosphate as a starting material is from 0.8 to 1.2 times by mole the theoretical amount calculated from the stoichiometric amount of the hexagonal phosphate-based compound to be synthesized, more preferably from 0.9 to 1.1 times by mole, and yet more preferably from 0.95 to 1.05 times by mole.

Similarly, a preferred amount of the zirconium-containing compound other than the layered zirconium phosphate added per mole of layered zirconium phosphate as a starting material is from 0.3 to 1.7 times by mole the theoretical amount calculated from the stoichiometric amount of the hexagonal phosphate-based compound to be synthesized, more preferably from 0.5 to 1.5 times by mole, and yet more preferably from 0.8 to 1.2 times by mole.

A method for mixing starting materials in the preparation step is not particularly limited as long as uniform mixing can be achieved, and any of a dry method and a wet method may be selected. Examples of a mixing device include, for dry mixing, a Loedige mixer, a Henschel mixer, and a V type mixer and, for wet mixing, a kneader, a cement mixer, and a three roll mill. One subjected to wet mixing is preferably dried prior to calcining. This is because the volume reduces and calcining can be carried out all at once, and thermal conductivity during calcining improves.

The calcining temperature in the calcining step, although it depends on the starting material formulation, is necessarily at least a temperature at which the layered zirconium phosphate is converted to hexagonal phosphate, and is preferably at least 650° C., more preferably at least 700° C., and yet more preferably at least 750° C. When the calcining temperature is too high, the particle size increases, and it is therefore preferably no greater than 1,500° C., more preferably no greater than 1,450° C., and yet more preferably no greater than 1,400° C.

The calcining time depends on the amount of starting materials charged and the performance of a calcining furnace, but when it is too short the quality of the filler is unstable, when it is too long the productivity becomes poor, and it is preferably at least 30 minutes but no longer than 24 hours.

The calcining device is not particularly limited as long as a mixture of starting materials can be heated at a predetermined temperature, and any method may be employed such as a method in which a mixture of starting materials is placed in a tray and calcined in an electric furnace or a gas furnace or a method in which calcining is carried out while making a mixture of starting materials flow using a rotary kiln.

The grinding step is not particularly limited as long as it is a method that enables a calcined product to be ground to primary particles, and a dry jet mill or a wet jet mill is preferable since primary particles having a narrow particle size distribution width are easily obtained. The calcined product may be roughly ground using a ball mill, a pin mill, etc. prior to jet milling.

{3} Glass Composition

The glass composition of the present invention is a glass composition comprising the filler of the present invention, and is preferably a composition comprising the filler of the present invention and a glass, and more preferably a low-melting-point glass, which is a glass for sealing. Since the low-melting-point glass has a larger thermal expansion than that of a glass as a sealing target, adjustment of thermal expansion is generally carried out by adding a filler having a low thermal expansion. The main component of a low-melting-point glass powder may employ a conventionally known formulation. Examples of the glass formulation include those below, but when the effect on the environment is considered, a lead-free glass formulation is preferable.

$Bi_2O_3$ (from 50 to 85 wt %)-ZnO (from 10 to 25 wt %)-$Al_2O_3$ (from 0.1 to 5 wt %)-$B_2O_3$ (from 2 to 20 wt %)-MO (from 0.2 to 20 wt %, M denotes an alkaline earth metal)

SnO (from 30 to 70 wt %)-ZnO (from 0 to 20 wt %)-$Al_2O_3$ (from 0 to 10 wt %)-$B_2O_3$ (from 0 to 30 wt %)-$P_2O_5$ (from 5 to 45 wt %)

PbO (from 70 to 85 wt %)-ZnO (from 7 to 12 wt %)-$SiO_2$ (from 0.5 to 3 wt %)-$B_2O_3$ (from 7 to 10 wt %)-BaO (from 0 to 3 wt %)

$V_2O_5$ (from 28 to 56 wt %)-ZnO (from 0 to 40 wt %)-$P_2O_5$ (from 20 to 40 wt %)-BaO (from 7 to 42 wt %)

$P_2O_5$ (from 20 to 60 wt %)-$Al_2O_3$ (from 5 to 40 wt %)-$M_2O$ (from 5 to 40 wt %, M denotes an alkali metal)

$P_2O_5$ (from 20 to 60 wt %)-ZnO (from 5 to 40 wt %)-BaO (from 5 to 40 wt %)-$Al_2O_3$ (from 1 to 10 wt %)

The mixing proportion of the filler in the glass composition is preferably at least 5 vol % since the effects are easily exhibited when the content of the filler is high, and is more preferably at least 10 vol %. Furthermore, since the smaller the content of the filler, the better the flowability and adhesion, at the time of sealing, of the composition tends to be, it is preferably no greater than 40 vol %, and more preferably no greater than 35 vol %. A glass composition for sealing is often mixed with a vehicle and used as a paste composition. The vehicle preferably comprises from 0.5 to 2 wt % of nitrocellulose as a solute and from 98 to 99.5 wt % of isoamyl acetate or butyl acetate as a solvent.

A method of combining the filler of the present invention with a sealing glass may employ a known method. Examples include a method in which a glass powder and a low thermal expansion filler are directly mixed using a mixer, a method in which, when an aggregated glass is ground, a low thermal expansion filler is placed together therewith, and grinding and mixing are carried out at the same time, and a method in which a glass powder and a low thermal expansion filler are separately added to and mixed with a paste material such as a vehicle.

The coefficient of thermal expansion of the glass composition of the present invention may be measured using a thermomechanical analyzer. The coefficient of thermal expansion, although it depends on the type of low-melting-point glass used, is preferably from $1\times10^{-7}$ to $150\times10^{-7}$ (/K), and more preferably from $1\times10^{-7}$ to $120\times10^{-7}$ (/K). When the coefficient of thermal expansion is from $1\times10^{-7}$ to $120\times10^{-7}$ (/K), it can be used effectively as a sealing glass.

With regard to application of the filler of the present invention, it may be used effectively in a sealing glass as a sealing material for an electronic component of a high-reliability package equipped with a device such as such as a Braun tube, a plasma display panel, a fluorescent display tube, an organic EL, an FED, a semiconductor integrated circuit, a quartz oscillator, or a SAW filter. A paste composition may often be used by mixing a vehicle with a glass composition comprising the filler of the present invention and a sealing glass.

The filler related to the present invention comprises a hexagonal phosphate-based compound, represented by Formula 1, having a purity of a predetermined value or higher and having an ionic impurity content of no greater than 1.0 wt %; the thermal expansion of a glass composition can be suppressed with a small amount of filler added, and excellent low thermal expansion performance is exhibited. Furthermore, a glass composition comprising the filler is excellent in terms of flowability at the time of melting.

The process for producing a hexagonal phosphate-based compound of the present invention can give a hexagonal phosphate-based compound having high purity and a small particle size.

EXAMPLES

The present invention is specifically explained by reference to Examples, but the present invention should not be construed as being limited thereby. In the description below, parts and % are on a weight basis unless otherwise specified.

1. Evaluation Methods (1) Purity of Filler

The purity of the filler in the present invention is a value obtained by multiplying the crystalline purity and the chemical purity. The crystalline purity was determined using the peak intensity ratio with respect to impurities after confirming the formation of a hexagonal crystal phase using powder X-ray diffraction. Specifically, the proportion of the intensity of the main peak (2θ=20.3°) of the hexagonal crystal phase relative to the sum of the intensities of the main peak of the hexagonal crystal phase and intensities of main peaks (2θ=9.8°, 21.5° and/or 28.3° of impurities was defined as the crystalline purity. Furthermore, the chemical purity was determined using a calculated compositional formula by measuring the contents of metal and phosphorus component contained in the filler using X-ray fluorescence analysis. With regard to one containing water of crystallization, it was determined using a calculated compositional formula by measuring the moisture content by TG-DTA analysis.

Powder X-Ray Diffraction

The crystal system of the hexagonal phosphate-based compound obtained by the production process of the present invention may be ascertained by powder X-ray diffraction analysis. The powder X-ray diffraction analysis may be carried out in accordance with the provisions of for example JIS K 0131 (set in 1996). The JIS provisions do not refer to the voltage applied to an X-ray tube, but this time X-ray diffraction measurement was carried out using Cu Kα radiation generated at a voltage applied to an X-ray tube employing a Cu target of 40 kV and a current value of 150 mA. When a crystalline substance is contained in a sample, a sharp diffraction peak appears in the X-ray diffraction pattern, and the diffraction angle 2θ of a diffraction peak is determined from the powder X-ray diffraction pattern obtained, the plane spacing d being calculated from λ=2d sin θ, thus enabling identification of the crystal system. The λ of Cu Kα radiation is 1.5418 angstrom.

(2) Particle Size

The median diameter and the maximum particle size of the filler were measured using a laser diffraction type particle size distribution analyzer and calculated by analysis on a volumetric basis.

(3) Ionic Compound Content 1 g of the filler was placed in 100 g of pure water, allowed to stand at 95° C. for 20 hours, and filtered using a membrane filter (0.1 μm), thus giving a filtrate. The concentration of P, K, and Zr in this filtrate was quantitatively determined using ICP optical emission analysis and converted into the amount of ionic compound. The P concentration was for all elements derived from phosphate ions. The results of these analyses are shown in Table 1.

(4) Flowability of Glass Composition

Product name 'VY-144' (formulation: $P_2O_5$—$Al_2O_3$—$Li_2O$—$Na_2O$—$K_2O$) manufactured by Nippon Frit Co., Ltd., which is a lead-free glass powder, was mixed with 30 vol % of the synthesized filler, the mixture was molded into a columnar shape of 10 mm diameter×6 mm height and then heated at 540° C. for 10 minutes using an electric furnace. The diameter of the glass aggregate thus obtained was measured using digital calipers, thus giving a flow diameter. When this flow diameter was close to that of the glass, it was evaluated as having good flowability. The flow diameter of the lead-free glass powder was 10.8 mm.

(5) Coefficient of Thermal Expansion of Glass Composition

The surface of the glass aggregate produced for evaluation of the flowability was smoothed, and the coefficient of thermal expansion at 30° C. to 300° C. was measured using a thermomechanical analyzer (model name 'TMA2940', TA Instruments). The coefficient of thermal expansion of the lead-free glass powder was $160\times10^{-7}$/K.

2. Production and Evaluation of Hexagonal Phosphate-Based Compound

Example 1

1,506 g of product name 'NS-10TZ' manufactured by Toagosei Co., Ltd., which is an a layered zirconium phosphate ($Zr(HPO_4)_2.H_2O$) having a median diameter of 2 μm, 246 g (1.0 times by mole the theoretical amount) of zirconium oxyhydroxide ($ZrO(OH)_2.H_2O$), and 231 g (1.0 times by mole the theoretical amount) of potassium carbonate were mixed in a 20 L Henschel mixer for 5 minutes. This mixture was heated to 1,350° C. in a calcining furnace over 6 hours and then calcined at 1,350° C. for 6 hours. Subsequently, the aggregate after calcining was ground using a ball mill and further ground using a dry jet mill to give primary particles, thus giving hexagonal phosphate-based compound A. The purity, median diameter, and amount of ionic compound of this hexagonal phosphate-based compound and the flowability and coefficient of thermal expansion of the glass composition were measured by the above methods, and the results are shown in Tables 1 and 2.

Example 2

1,506 g of product name 'NS-10TZ' manufactured by Toagosei Co., Ltd., which is an a layered zirconium phosphate ($Zr(HPO_4)_2.H_2O$) having a median diameter of 2 μm, 260 g (1.0 times by mole the theoretical amount) of zirconium oxyhydroxide ($ZrO(OH)_2.H_2O$), 335 g (1.0 times by mole the theoretical amount) of potassium bicarbonate, and 750 g of pure water were mixed in a 20 L Henschel mixer for 5 minutes. This mixture was dried at 250° C. for 15 hours. Subsequently, the dried mixture was heated to 1,250° C. in a calcining furnace over 6 hours and then calcined at 1,250° C. for 12 hours. The aggregate after calcining was ground using a ball mill and further ground using a dry jet mill to give primary particles, thus giving hexagonal phosphate-based compound B. This hexagonal phosphate-based compound was evaluated in the same manner as in Example 1.

Example 3

1,506 g of product name 'NS-10TZ' manufactured by Toagosei Co., Ltd., which is an a layered zirconium phosphate ($Zr(HPO_4)_2.H_2O$) having a median diameter of 2 μm, 246 g (1.0 times by mole the theoretical amount) of zirconium oxyhydroxide ($ZrO(OH)_2.H_2O$), and 938 g (1.0 times by mole the theoretical amount) of 20 wt % potassium hydroxide aqueous solution were mixed in a 20 L Henschel mixer for 5 minutes. This mixture was dried at 250° C. for 15 hours. Subsequently, the dried mixture was heated to 1,250° C. in a calcining furnace over 6 hours and then calcined at 1,250° C. for 6 hours. The aggregate after calcining was ground using a ball mill and further ground using a dry jet mill to give primary particles, thus giving hexagonal phosphate-based compound C. This hexagonal phosphate-based compound was evaluated in the same manner as in Example 1.

Example 4

1,506 g of product name 'NS-10TZ' manufactured by Toagosei Co., Ltd., which is an a layered zirconium phosphate ($Zr(HPO_4)_2.H_2O$) having a median diameter of 2 μm, 123 g (0.5 times by mole the theoretical amount) of zirconium oxyhydroxide ($ZrO(OH)_2.H_2O$), and 231 g (1.1 times by mole the theoretical amount) of potassium carbonate were mixed in a 20 L Henschel mixer for 5 minutes. This mixture was heated to 1,250° C. in a calcining furnace over 6 hours and then calcined at 1,250° C. for 6 hours. Subsequently, the aggregate after calcining was ground using a ball mill and further ground using a dry jet mill to give primary particles, thus giving hexagonal phosphate-based compound D. This hexagonal phosphate-based compound was evaluated in the same manner as in Example 1.

Comparative Example 1

290 g of oxalic acid dihydrate and 2,787 g of 20 wt % zirconium oxychloride aqueous solution were dissolved in 7 L of pure water, and 897 g of 75 wt % phosphoric acid aqueous solution was added thereto while stirring. 20 wt % potassium hydroxide aqueous solution was added to this solution until the pH became 2.7, and a reaction was carried out at 98° C. for 6 hours. Subsequently, filtration and washing with pure water were carried out using a ceramic filter, and the solids content was dried at 250° C. for 15 hours, thus giving hexagonal phosphate-based compound E. This hexagonal phosphate-based compound was evaluated in the same manner as in Example 1.

Comparative Example 2

319 g of sodium carbonate and 556 g of sodium bicarbonate were dissolved in 7 L of pure water, 3,592 g of 20 wt % zirconium oxychloride aqueous solution was added thereto while stirring, and a reaction was carried out at 30° C. for 15 hours. Subsequently, filtration and washing with pure water were carried out using a ceramic filter. 1,030 g of 75 wt % phosphoric acid aqueous solution and 931 g of 20 wt % potassium hydroxide aqueous solution were added to this slurry, and a reaction was carried out at 98° C. for 2 hours. Subsequently, filtration and washing with pure water were carried out using a ceramic filter, and the solids content was dried at 250° C. for 15 hours. Subsequently, the dried mixture was heated to 1,250° C. in a calcining furnace over 6 hours and then calcined at 1,250° C. for 6 hours. After grinding in a dry ball mill, grinding was further carried out using a dry jet mill, thus giving hexagonal phosphate-based compound F. This hexagonal phosphate-based compound was evaluated in the same manner as in Example 1.

Comparative Example 3

240 g of potassium carbonate and 372 g of sodium bicarbonate were dissolved in 7 L of pure water, and 1,960 g of 20 wt % zirconium oxychloride aqueous solution was added thereto while stirring. 562 g of 75 wt % phosphoric acid aqueous solution and 448 g of 20 wt % potassium hydroxide aqueous solution were added thereto, and a reaction was carried out at 98° C. for 2 hours. Subsequently, filtration and washing with pure water were carried out using a ceramic filter, and the solids content was dried at 250° C. for 15 hours. Subsequently, this dried reaction product was heated to 1,350° C. in a calcining furnace over 6 hours and then calcined at 1,350° C. for 6 hours. After grinding in a dry ball mill, grinding was further carried out using a dry jet mill, thus giving hexagonal phosphate-based compound G. This hexagonal phosphate-based compound was evaluated in the same manner as in Example 1.

Comparative Example 4

138 g of potassium carbonate, 246 g of zirconium oxide, 396 g of diammonium hydrogenphosphate, and 15 g of magnesium oxide as a sintering aid were mixed in a 20 L Henschel mixer for 5 minutes. Subsequently, this mixture was heated to 1,450° C. in a calcining furnace over 6 hours and then calcined at 1,450° C. for 6 hours. After grinding in a dry ball mill, grinding was further carried out using a dry jet mill, thus giving hexagonal phosphate-based compound H. This hexagonal phosphate-based compound was evaluated in the same manner as in Example 1.

When the same procedure was carried out except that the calcining temperature was 1,350° C., there was much zirconium oxide remaining, and hardly any of the target hexagonal phosphate-based compound was obtained.

Comparative Example 5

1,506 g of product name 'NS-10TZ' manufactured by Toagosei Co., Ltd., which is an a layered zirconium phosphate ($Zr(HPO_4)_2.H_2O$) having a median diameter of 2 μm, 246 g (1.0 times by mole the theoretical amount) of zirconium oxyhydroxide ($ZrO(OH)_2.H_2O$), and 307 g (1.3 times by mole the theoretical amount) of potassium carbonate were mixed in a 20 L Henschel mixer for 5 minutes. This mixture was heated to 1,250° C. in a calcining furnace over 6 hours and then calcined at 1,250° C. for 6 hours. Subsequently, the aggregate after calcining was ground using a ball mill and further ground using a dry jet mill to give primary particles, thus giving hexagonal phosphate-based compound I. This hexagonal phosphate-based compound was evaluated in the same manner as in Example 1.

TABLE 1

| | Concentration in filtrate (ppm) | | | | Ionic compound |
|---|---|---|---|---|---|
| | $PO_4^{2-}$ | $K^+$ | $Zr^{4+}$ | Total | (wt %) |
| Example 1 | 15.2 | 2.6 | 0.8 | 18.6 | 0.2 |
| Example 2 | 16.3 | 2.9 | 0.7 | 19.9 | 0.2 |
| Example 3 | 15.0 | 2.4 | 0.9 | 18.3 | 0.2 |
| Example 4 | 64.2 | 18.4 | 1.3 | 83.9 | 0.8 |
| Comparative Example 1 | 468.7 | 156.9 | 16.8 | 642.4 | 6.4 |
| Comparative Example 2 | 449.0 | 109.7 | 1.5 | 560.2 | 5.6 |
| Comparative Example 3 | 289.2 | 87.0 | 0.5 | 376.7 | 3.8 |
| Comparative Example 4 | 138.2 | 26.4 | 0.7 | 165.3 | 1.7 |
| Comparative Example 5 | 106.3 | 49.7 | 7.8 | 163.8 | 1.6 |

TABLE 2

| | | | | | | | Glass composition | |
|---|---|---|---|---|---|---|---|---|
| | Phosphate-based compound type | Compositional formula | Purity (wt %) | Median diameter (μm) | Maximum particle size (μm) | Ionic compound (wt %) | Flow diameter (mm) | Coefficient of thermal expansion ($\times 10^{-7}$/K) |
| Example 1 | A | $KZr_2(PO_4)_3$ | 98.2 | 1.2 | 3.8 | 0.2 | 9.9 | 107 |
| Example 2 | B | $K_{1.04}Zr_{1.99}(PO_4)_3$ | 93.1 | 1.4 | 4.4 | 0.2 | 9.8 | 111 |
| Example 3 | C | $K_{0.92}Zr_{2.02}(PO_4)_3$ | 97.6 | 1.7 | 5.0 | 0.2 | 10.1 | 112 |
| Example 4 | D | $KZr_2(PO_4)_3$ | 91.2 | 1.7 | 7.9 | 0.8 | 9.5 | 119 |
| Comparative Example 1 | E | $KZr_2(PO_4)_3$ | 92.1 | 2.3 | 15.1 | 6.4 | 8.8 | 125 |
| Comparative Example 2 | F | $K_{1.2}Zr_{1.95}(PO_4)_3$ | 96.3 | 1.7 | 8.7 | 5.6 | 8.9 | 116 |
| Comparative Example 3 | G | $K_{1.12}Zr_{1.97}(PO_4)_3$ | 97.2 | 1.8 | 10 | 3.8 | 8.6 | 113 |
| Comparative Example 4 | H | $K_{0.92}Zr_{2.02}(PO_4)_3$ | 88.7 | 13.1 | 79.4 | 1.7 | 9.1 | 141 |
| Comparative Example 5 | I | $KZr_2(PO_4)_3$ | 48.6 | 3.3 | 22.9 | 1.6 | 8.6 | 138 |

As shown in Table 2, the fillers of Examples 1 to 4 had an ionic compound content of no greater than 1.0 wt %, and the glass compositions containing same had excellent low thermal expansion and high flowability. On the other hand, the fillers of Comparative Examples 1 to 5 had an ionic compound content outside the scope of the present invention, and the flowability of the glass composition was low. Furthermore, the process for producing a hexagonal phosphate-based compound of the present invention could use a lower calcining temperature than that of the calcination method shown in Comparative Example 4, and it was easy to adjust the median diameter so as to be no greater than 10 μm.

INDUSTRIAL APPLICABILITY

The filler of the present invention is excellent in terms of control of thermal expansion when applied to lead-free glass, etc. and also gives excellent flowability when the glass is melted, and it can be used as a sealing agent composition for an electronic component such as a Braun tube, a PDP, a fluorescent display tube, an organic EL, or an IC ceramic package.

The process for producing a hexagonal phosphate-based compound of the present invention has excellent productivity and processability, a hexagonal phosphate-based compound having controlled particle size is obtained, and the hexagonal phosphate produced by the process of the present invention can be used as a filler in a sealing glass, etc. for an electronic component such as a Braun tube, a PDP, a fluorescent display tube, an organic EL, or an IC ceramic package.

What is claimed is:

1. A process for producing a hexagonal phosphate-based compound represented by the following Formula 1, the process comprising:

obtaining a mixture by combining a layered zirconium phosphate, a potassium-containing compound, and a zirconium-containing compound other than the layered zirconium phosphate;

calcining the mixture; and grinding subsequent to the calcining:

$$K_aZr_b(PO_4)_3 \quad (1)$$

wherein, in Formula 1, a is a positive number of from 0.8 to 1.2 and b is a positive number satisfying a+4b=9.

2. The process for producing a hexagonal phosphate-based compound according to claim 1, wherein the layered zirconium phosphate comprises particles having a median diameter on a volume basis measured by a laser diffraction type particle size distribution analyzer of from 0.05 to 10 μm.

3. The process for producing a hexagonal phosphate-based compound according to claim 1, wherein the potassium-containing compound is combined in an amount per mole of the layered zirconium phosphate of from 0.8 to 1.2 times a theoretical amount of the hexagonal phosphate-based compound to be produced.

4. The process for producing a hexagonal phosphate-based compound according to claim 1, wherein a calcining temperature is from 650° C. to 1,500° C.

* * * * *